United States Patent [19]

Allison et al.

[11] Patent Number: 5,330,804
[45] Date of Patent: Jul. 19, 1994

[54] SYNTHETIC WOOD MULCH

[75] Inventors: John G. Allison, Brevard, N.C.; Hal J. Thompson, Naples, Fla.

[73] Assignee: Earth Trends, Inc., Brevard, N.C.

[21] Appl. No.: 680,802

[22] Filed: Mar. 27, 1991

[51] Int. Cl.$^5$ ............................................. A01G 13/02
[52] U.S. Cl. ............................................. 428/15; 47/9; 428/17
[58] Field of Search .................... 47/9, 91; 156/61; 428/15, 17

[56] References Cited

U.S. PATENT DOCUMENTS

| | | | |
|---|---|---|---|
| 2,685,150 | 8/1954 | Linehan | 427/4 X |
| 3,420,729 | 1/1969 | Roberts | 428/35.7 |
| 3,555,728 | 1/1971 | Herns | 428/136 X |
| 3,673,134 | 6/1972 | Anderson | 523/132 |
| 3,932,319 | 1/1976 | Clendinning et al. | 47/9 X |
| 4,062,145 | 12/1977 | Gidge | 47/9 |
| 4,124,562 | 11/1978 | Yui et al. | 524/418 X |
| 4,146,660 | 3/1979 | Hall et al. | 428/2 |
| 4,153,587 | 5/1979 | Yui | 524/505 |
| 4,166,340 | 9/1979 | Pluenneke | 47/58 |
| 4,171,401 | 10/1979 | Legrix et al. | 428/17 X |
| 4,391,767 | 7/1983 | Pears | 428/187 X |
| 4,686,790 | 8/1987 | Lahalih et al. | 47/9 |
| 4,794,726 | 1/1989 | Fawcett et al. | 47/9 |
| 4,852,870 | 8/1989 | Hawkins et al. | 428/15 X |
| 4,855,166 | 8/1989 | Allison | 428/15 |
| 4,910,052 | 3/1990 | Caldwell | 428/17 X |
| 5,047,099 | 9/1991 | Caldwell | 428/15 X |
| 5,082,605 | 1/1992 | Brooks et al. | 428/15 X |
| 5,105,577 | 4/1992 | Hedges | 47/9 |

*Primary Examiner*—Henry F. Epstein
*Attorney, Agent, or Firm*—Carter & Schnedler

[57] ABSTRACT

There is provided a synthetic wood article formed as an irregularly shaped substrate. The substrate is made from at least one plastic and preferably from post-consumer plastics such as, for example, from disposed of PET bottles or PE trash bags. The article may have the appearance of a wood chip, bark, shredded wood, or sawdust. The substrate is formed by chipping, shredding, or pulverizing a solid piece of plastic which has been extruded. The substrate may have multi layers thereby presenting a wood grain appearance. A plurality of such articles may be used as a synthetic wood mulch.

19 Claims, 2 Drawing Sheets

SYNTHETIC WOOD MULCH

BACKGROUND OF THE INVENTION

This invention relates to ground covers and mulches. More particularly it relates to ground covers and mulches made of synthetic and, preferably, recycled materials. Hereinafter the term mulch shall be used to denote both a mulch and a ground cover.

Most mulches are made from wood chips, small chunks of bark, shredded wood and/or sawdust which are processed from trees, i.e. natural wood materials. Mulch helps retain moisture in the soil and adds aesthetic appeal to the ground.

One of the problems associated with the use of natural materials as mulch is the considerable expense associated therewith. In general, natural mulches are relatively heavy articles and are readily available only in certain parts of the country. Transportation costs from a wooded region to the places of use can be high. Furthermore, in that these materials are naturally occurring, the environment is affected when the trees which are the raw material for the mulch are cut.

At the same time, in every geographic region of the country enormous quantities of post-consumer plastics are being disposed of in landfills and are becoming a nightmare for waste management personnel. These post-consumer plastics include PET bottles, PET containers, nylons, PE trash bags, and other plastic articles.

With the high expense of natural mulches and the ready availability of post-consumer plastics, Earth Trends, Inc., assignee of this application, has proposed the manufacture of artificial pine needles utilizing post-consumer plastics as a primary feedstock. The use of an artificial pine needle used as a mulch is described in U.S. Pat. No. 4,855,166 issued Aug. 8, 1989 and assigned to Earth Trends, Inc. While the synthetic pine needle is a great stride toward providing a needed product made from post-consumer plastics, the pine needle represents only one of many types of mulches.

There have been other attempts to utilize synthetic mulches. One such attempt is disclosed in U.S. Pat. No. 4,794,726 issued to Fawcett et al. The Fawcett patent utilizes a mulch made of aluminum flakes bonded to a woven mesh so that the flakes will reflect the rays of the sun upwardly and will hold moisture in the ground.

Another attempt is described in U.S. Pat. No. 3,555,728 issued to Herns. The Herns patent shows a mulch made of an elongated sheet of flexible waterproof material having pockets spaced along the sheet. Old newspapers and the like are inserted into the pockets.

U.S. Pat. No. 4,166,340 issued to Pluenneke describes a growing pot which is lined with loose reclaimed used tire fibers.

U.S. Pat. No. 3,673,134 issued to Anderson shows a plastic film which may be used as an agricultural mulch.

OBJECTS OF THE INVENTION

It is therefore one object of this invention to provide an improved synthetic mulch.

It is another object to provide improved synthetic wood articles.

It is another object to provide an improved method of producing synthetic wood articles.

It is still another object to provide a means for utilizing post-consumer waste materials in a constructive and economical fashion.

It is another object to utilize post-consumer waste materials in an aesthetically pleasing manner without harm to the environment.

SUMMARY OF THE INVENTION

In accordance with one form of this invention there is provided a synthetic wood article formed as an irregularly shaped substrate. The substrate is substantially made of at least one plastic. Preferably the substrate includes a plurality of discrete layers, thereby exhibiting somewhat of a wood grain appearance. In one form the layers are stacked so that adjacent edges overlap thereby enhancing the wood grain appearance. The article may have the appearance of a wood chip, a piece of bark, shredded wood, or sawdust. The synthetic wood articles are particularly adapted to be utilized as a mulch.

In another form of this invention there is provided a process for producing the synthetic wood articles described above. The process includes extruding post-consumer plastic materials, molding the resulting extrusion into a manageable size and shape, extracting the molded article, and forming small pieces of the extracted article by means of a chipper, shredder, hammer mill, pulverizer or the like, thereby producing the desired article. Various fillers and other additives may be added during the extrusion step.

The articles produced will have the appearance of a natural wood article and will provide moisture retention and a pleasing appearance when used as a mulch. Furthermore, in that the articles have been chipped, pulverized or shredded, the surface area of the plastic is spread out and upon exposure to sun, oxygen, water, and changes in temperature, the article will degrade much quicker than if the post-consumer materials were placed in a landfill and covered.

BRIEF DESCRIPTION OF THE DRAWINGS

The subject matter which is regarded as the invention is set forth in the appended claims. The invention itself, however, together with further objects and advantages thereof may be better understood by reference to the accompanying drawings in which:

DESCRIPTION OF THE PREFERRED EMBODIMENTS

Figure 1:
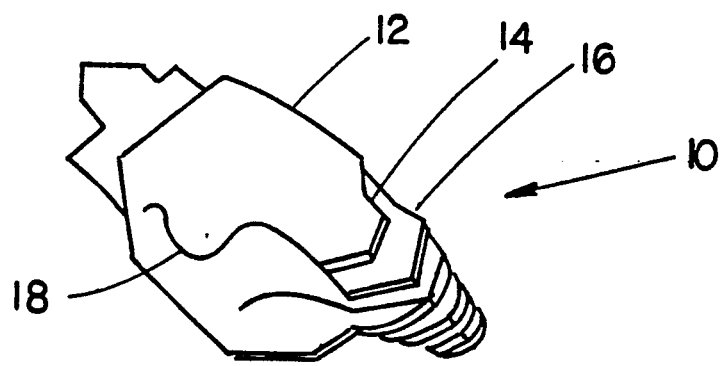
FIG. 1 is a pictorial view of a synthetic wood article of the subject invention which is in the form of a wood chip.
Figure 2:
FIG. 2 is a side elevational view of the article of FIG. 1.
Figure 3:
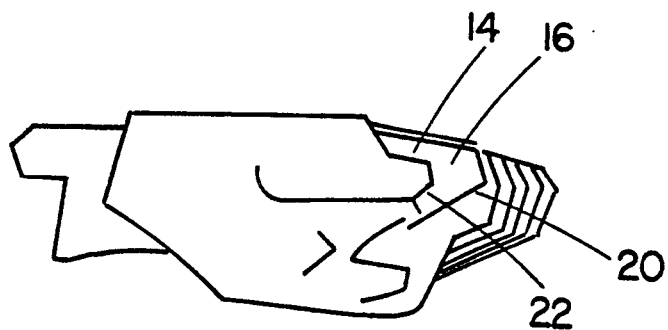
FIG. 3 is a top view of the article of FIG. 1.

Referring now more particularly to FIGS. 1 through 3, there is provided synthetic wood article 10 which in this embodiment is in the form of a wood chip. The synthetic wood article 10 is formed as an irregularly shaped substrate 12 having a plurality of layers such as adjacent layers 14 and 16. Each layer such as top layer 14 includes irregularities 18. Preferably each adjacent layer is overlapped so that layer 16 protrudes outwardly from the edge of layer 14. That is, edge 20 of layer 16 protrudes outwardly from edge 22 of layer 14 and so on like stair steps. The layers and the overlap of the adjacent edges thereof presents a grainy appearance, thereby better simulating the appearance of natural wood. The adjacent layers 14 and 16 are bonded to one another so that the substrate 12 will hold together. It is not necessary that the bond be an excessively tight bond.

Figure 4:
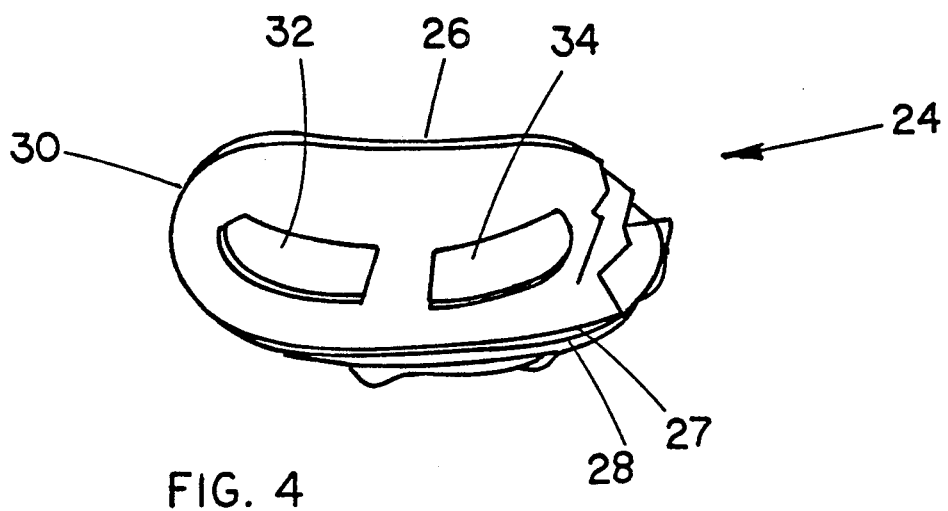
FIG. 4 is a pictorial view of a synthetic wood article of the subject invention which is in the form of a synthetic bark.

Referring now to FIG. 4, there is provided synthetic wood article 24 which in this embodiment is in the form of a piece of bark. Article 24 is in the form of a substrate 26 which also has a plurality of layers such as, for example, adjacent layers 27 and 28. The synthetic bark, while also being of an irregular shape, has somewhat rounded corners such as, for example, corner 30 to appear more like natural bark. Also the top of layer 27 includes lands 32 and 34, again to appear more like natural bark. These lands may be molded onto the top layer 27.

Figure 5:
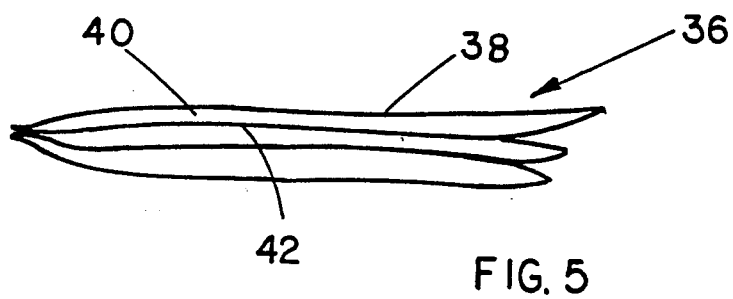
FIG. 5 is a top view of a synthetic wood article of the subject invention which is in the form of shredded wood.

Referring now more particularly to FIG. 5, there is provided synthetic wood article 36 which in this embodiment is in the form of shredded wood. Synthetic shredded wood is formed as substrate 38 having a plurality of layers such as, for example, adjacent layers 40 and 42. Substrate 38 is also irregular in shape but substantially more elongated and more narrow than the wood chip of FIG. 1 and the bark of FIG. 4.

Figure 6:
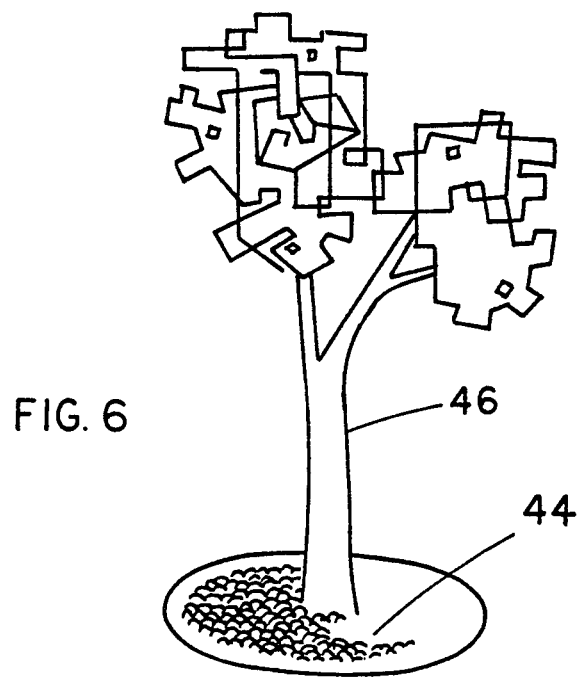
FIG. 6 is a pictorial view showing the synthetic wood articles of FIGS. 1 through 5 being used as mulch.

It is preferred that the articles described in FIGS. 1 through 5 are used as mulch. Referring now to FIG. 6, there is shown a plurality of the articles described in FIGS. 1 through 5 generally indicated at 44 which are being used as a mulch for the ground around tree 46. The mulch 44 will retain the moisture around the base of the tree 46 and since the articles 44 are exposed to the elements the synthetic wood will degrade doing little harm to the environment. The mulch 44 will also restrain or restrict the growth of unwanted weeds.

Figure 7:
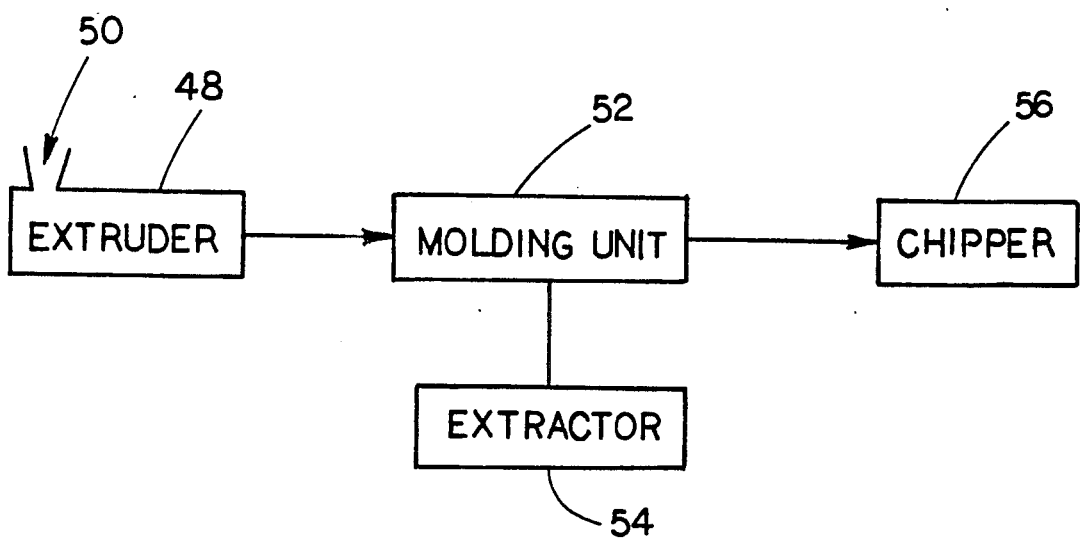
FIG. 7 shows a block diagram of a process for producing the synthetic wood articles of FIGS. 1 through 3.

The articles described in FIGS. 1 through 5 may be manufactured as set forth below. Referring now more particularly to FIG. 7, there is provided extruder 48, molding unit 52, extractor 54 and chipper 56. The sources of raw materials are preferably post-consumer plastics such as, for example, PET bottles, polyethylene bottles and trash bags, plastic milk bottles, and other plastic items. These post-consumer plastics are fed into the extruder together through opening 50. It is not necessary to segregate the raw materials into various types of plastics as one would normally do in a recycling process. The extruder heats the materials and ejects the extrusions into molding units 52. Because of the heat gradient within the extruder and because of the fact that various plastic materials are used, layers of plastic are formed within the molding unit 52 as the materials are cooled. The layers may also be formed by orienting the molded article in a particular manner prior to cutting it. By cutting in one direction a grain will be exhibited and by cutting in another direction the cut article will appear more serrated. Layers also may be formed by using a multiple outlet extruder head (not shown).

As the molding unit forms the extruded plastics into a handleable article, extractor 54 forces the molded article out of the molding unit which is made easier because of shrinkage of the molded article as it cools. The molded article, which may be in the form of an elongated log, is then moved to a manipulating apparatus which in the embodiment shown in FIG. 7 is chipper 56. Chipper 56 then reduces the molded log to the smaller synthetic wood chips as shown in FIGS. 1 through 3. The chipped articles then may be bagged and transported to a site for use as a mulch. The chipper 56 may be replaced with a shredder in order to produce the articles shown in FIG. 5 or a pulverizer in order to produce such things as sawdust. If it is desired to produce the artificial bark as shown in FIG. 4, at least portions of the bark should be molded so as to ensure the barklike appearance.

By chipping or shredding the large molded article into smaller pieces, the surface area of the plastic is substantially increased and by exposing these small articles to the ultraviolet light of the sun, to freeze and thaw cycles, to oxygen and water, the molecular linkage of the plastic is weakened resulting in depolymerizaton, thereby quickly degrading the plastic materials. The degrading occurs much faster than if the post-consumer plastics were deposited directly into a landfill and either covered or left uncovered.

Various fillers may also be added to the plastic during extrusion such as, for example, calcium carbonate and talc, as well as coloring agents such as, for example, iron oxide., in order to give the materials somewhat of a natural brown appearance. Flame retardant such as boric oxide may be added to reduce the possibility of fire. Furthermore, certain animal impeding odors may also be added to the plastic to keep animals from removing or chewing on the synthetic wood articles. Urea or other fertilizers may also be added to the plastic during extrusion or may be coated on after extrusion so that fertilizer is deposited on the ground as the synthetic plastics decay.

Systems are currently available for producing a large molded article such as, for example, a six-foot by two-inch plastic log utilizing combinations of post-consumer plastics. One such system which utilizes an extruder, molding unit and an extractor is currently available from Mid Atlantic Plastic Systems, Inc. of Roselle, New Jersey. Furthermore, synthetic logs made from recycled plastic materials are commercially available from National Waste Products, Inc. of Long Island, New York and Super Wood, Inc. of Anniston, Alabama.

The types of synthetic materials which are particularly useful in producing the synthetic wood articles referred to herein are generally referred to as plastics which include polyolefins. The polyolefin which are most useful are polyester (PET), polyvinyl chloride (PVC), polypropylene (PP), and polyethylene (PE).

Thus there is provided synthetic wood articles which are formed utilizing post-consumer plastics which when utilized as a mulch provide water retention and aesthetic benefits of natural mulch and which permit the convenient, environmentally safe, and economical disposal of post-consumer plastics.

From the foregoing description of the preferred embodiments of the invention it is apparent that many modifications may be made therein without departing from the true spirit and scope of the invention.

We claim:

1. A synthetic wood article comprising:

an irregular wood chip shaped substrate; said substrate being substantially formed from at least first and second plastics; said substrate having a plurality of discrete layers; at least one of said layers being made substantially from said first plastic and at least another of said layers being made substantially of said second plastic; portions of adjacent layers adhering to one another; said layers having edges; an edge of one layer overlapping and being offset from the edge of its adjacent layer; said offset edges being substantially irregular.

2. An article as set forth in claim 1 wherein said substrate has a grain appearance.

3. An article as set forth in claim 1 wherein said substrate has the appearance of a wood chip.

4. An article as set forth in claim 1 wherein said substrate has the appearance of bark.

5. An article as set forth in claim 1 wherein said substrate has the appearance of shredded wood.

6. An article as set forth in claim 1 wherein said plastics are selected from the group consisting of polyethylene terephthalate, polyethylene, polyvinylchloride and polypropylene.

7. An article as set forth in claim 1 further including a coloring agent mixed with said plastics.

8. An article as set forth in claim 7 wherein said coloring agent is iron oxide whereby said substrate is brown.

9. An article as set forth in claim 1 further including fillers mixed with said plastics.

10. An article as set forth in claim 9 wherein said fillers are selected from the group consisting of calcium carbonate and talc.

11. An article as set forth in claim 1 further including a flame retardant mixed with said plastics.

12. An article as set forth in claim 11 wherein said flame retardant is boric acid.

13. An article as set forth in claim 1 wherein odors are mixed with said plastics for impeding animals.

14. An article as set forth in claim 1 further including fertilizer mixed with said plastics.

15. An article as set forth in claim 14 wherein said fertilizer is urea.

16. A synthetic mulch comprising:
a plurality of irregular wood chip shaped substrates; each of said substrates formed from at least first and second plastics; said substrates adapted to be used as a mulch; each of said substrates including a plurality of discrete layers; at least one layer being made substantially from said first plastic and at least another of said layers being made substantially of said second plastic; portions of adjacent layers adhering to one another; said layers having edges; said edges of adjacent layers overlapping and being offset from one another thereby enhancing the visibility of said layers.

17. A mulch as set forth in claim 16 wherein said substrates have the appearance of a wood chip.

18. A mulch as set forth in claim 16 wherein said substrates have the appearance of bark.

19. A mulch as set forth in claim 16 wherein said substrates have the appearance of shredded wood.

* * * * *